United States Patent
Pacheco (10) Patent No.: US 10,807,720 B2
(45) Date of Patent: Oct. 20, 2020

(54) DETACHABLE CABIN ATTENDANT SEAT

(71) Applicant: GOODRICH CORPORATION, Charlotte, NC (US)

(72) Inventor: Chad R. Pacheco, Colorado Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/284,052

(22) Filed: Feb. 25, 2019

(65) Prior Publication Data

US 2020/0269985 A1    Aug. 27, 2020

(51) Int. Cl.
*B60N 2/30* (2006.01)
*B64D 11/06* (2006.01)

(52) U.S. Cl.
CPC ...... *B64D 11/0691* (2014.12); *B64D 11/0639* (2014.12); *B64D 11/0698* (2014.12)

(58) Field of Classification Search
CPC ............ B64D 11/0639; B64D 11/0691; B64D 11/0698
USPC .......................................................... 297/14
See application file for complete search history.

(56) References Cited

U.S. PATENT DOCUMENTS

| | | | | |
|---|---|---|---|---|
| 3,594,037 A * | 7/1971 | Sherman | ................ | A47C 1/036 297/14 |
| 4,460,215 A * | 7/1984 | Chamberlain | .......... | A47C 9/06 297/14 |
| 4,740,030 A * | 4/1988 | Nordskog | .............. | B64D 11/06 297/13 |
| 4,799,632 A * | 1/1989 | Baymak | ............. | B64D 11/0691 297/14 X |
| 4,832,404 A * | 5/1989 | Baymak | ............. | B64D 11/0691 297/14 X |
| 4,902,069 A * | 2/1990 | Lehnert | .............. | B64D 11/0691 297/14 |
| 4,993,666 A * | 2/1991 | Baymak | .................... | B09B 1/00 297/14 X |
| 5,335,963 A * | 8/1994 | Muller | .................. | B64D 11/06 297/14 X |
| 8,770,659 B2 | 7/2014 | Isherwood et al. | | |
| 8,851,568 B2 * | 10/2014 | Funk | .................... | B60N 2/3015 297/14 X |
| 9,022,462 B2 * | 5/2015 | Johnson | ................ | B64D 11/06 297/14 |
| 9,511,867 B2 | 12/2016 | Schliwa et al. | | |
| 9,802,706 B2 | 10/2017 | Schliwa et al. | | |
| 9,840,332 B2 * | 12/2017 | Castanos | ............... | B64D 11/02 |
| 10,046,678 B2 * | 8/2018 | Ham | .................. | B60N 2/42709 |
| 10,293,944 B2 * | 5/2019 | Spagl | .................. | B64D 11/064 |
| 10,414,503 B2 * | 9/2019 | Spagl | ................. | B64D 11/0698 |
| 10,543,923 B2 * | 1/2020 | Pacheco | ............ | B64D 11/0639 |

(Continued)

*Primary Examiner* — Rodney B White
(74) *Attorney, Agent, or Firm* — Snell & Wilmer L.L.P.

(57) ABSTRACT

The present disclosure provides a detachable cabin attendant seat (CAS). In various embodiments, the detachable CAS may comprise a first section, comprising, a first rod and a second rod, and a first post and a second post extending from the first section, wherein the first post and the second post are configured to be coupled to a mount assembly when the detachable CAS is in a stowed position and the first rod and the second rod are configured to be coupled to the mount assembly when the detachable CAS is in a deployed position.

21 Claims, 7 Drawing Sheets

(56) References Cited

U.S. PATENT DOCUMENTS

| | | | | |
|---|---|---|---|---|
| 2014/0166808 A1* | 6/2014 | Boenning | ............ | B60N 2/3002 |
| | | | | 244/118.6 |
| 2014/0319275 A1* | 10/2014 | Najd | ...................... | B64D 11/02 |
| | | | | 297/14 X |
| 2014/0375086 A1* | 12/2014 | Schliwa | ................. | B64D 11/06 |
| | | | | 297/14 |
| 2015/0084391 A1* | 3/2015 | Schliwa | ............. | B64D 11/0691 |
| | | | | 297/344.1 |
| 2015/0232185 A1* | 8/2015 | Johnson | ............ | B64D 11/0689 |
| | | | | 297/14 |
| 2018/0057169 A1* | 3/2018 | Phi | ..................... | B64D 11/0639 |
| 2018/0148178 A1* | 5/2018 | Koehler | ............ | B64D 11/0698 |
| 2019/0277443 A1* | 9/2019 | Tinoco | ............... | B64D 11/0015 |
| 2019/0322372 A1* | 10/2019 | Hoover | .............. | B60N 2/42709 |

* cited by examiner

DETACHABLE CABIN ATTENDANT SEAT

FIELD OF THE DISCLOSURE

The present disclosure relates to aircraft cabin seats, and more particularly, to detachable aircraft cabin attendant seats.

BACKGROUND OF THE DISCLOSURE

Passenger aircraft typically include one or more Cabin Attendant Seats ("CASs") configured to allow on-duty flight attendants to sit as the aircraft undergoes certain operating conditions, such as takeoff, landing, and/or times of excessive turbulence. Conventional CASs may be stowed in a closet or bay when not in use and rotated or otherwise maneuvered into a deployed position utilizing complex hinge systems. However, such systems may be expensive to manufacture, heavy, and/or unreliable.

SUMMARY OF THE DISCLOSURE

A detachable cabin attendant seat (CAS) may comprise a first section, comprising, a first rod and a second rod, and a first post and a second post extending from the first section, wherein the first post and the second post are configured to be coupled to a mount assembly when the detachable CAS is in a stowed position and the first rod and the second rod are configured to be coupled to the mount assembly when the detachable CAS is in a deployed position.

In various embodiments, the detachable CAS may further comprise a third post extending from the first section and configured to be coupled to the mount assembly when the detachable CAS is in the stowed position. The detachable CAS may further comprise a second section pivotably coupled to the first section. The second section may be pivotably coupled to the first section via the second rod. The detachable CAS may further comprise a first cutout proximate to a top portion of the first section and a second cutout proximate to a bottom portion of the first section. The first rod and the second rod may be situated within the first section and the first post and the second post may extend from a rear surface of the first section. The detachable CAS may further comprise one or more handles coupled to an edge of the first section.

A detachable cabin attendant seat assembly may comprise a detachable CAS, and a mount assembly, wherein the detachable CAS is configured to be coupled to the mount assembly via a first post and a second post in a stowed position and coupled to the mount assembly via a first rod and a second rod in a deployed position.

In various embodiments, the mount assembly may comprise a main frame comprising a hook cavity and a latch cavity. The hook cavity may be configured to receive the second post in the stowed position and receive the second rod when the detachable CAS is in the deployed position. The latch cavity may be configured to receive the first post in the stowed position and receive the first rod when the detachable CAS is in the deployed position. The mount assembly may further comprise a locking pin configured to lock the first post and the first rod in place upon entering the latch cavity. The locking pin may comprise a beveled surface configured to urge the locking pin upwards in response to contact from the first post or the first rod. The locking pin may be situated within a channel formed through an upper protrusion of the main frame. The detachable CAS may further comprise a third post and the main frame may further comprise a stabilization cavity, wherein the stabilization cavity is configured to receive the third post when the detachable CAS is in the stowed position. The detachable CAS may be configured to be completely detached from the mount assembly to transition the detachable CAS from the stowed position to the deployed position. The mount assembly may further comprise a secondary frame configured to receive a locking pin.

A method of manufacturing a detachable cabin attendant seat (CAS) mounting assembly may comprise forming a detachable CAS comprising a first post, a second post, a first rod, and a second rod, and forming a mount assembly comprising a latch cavity and a hook cavity, wherein the first post and second post are configured to be coupled to the latch cavity and the hook cavity, respectively, when the detachable CAS is in a stowed position, and wherein the first rod and the second rod are configured to be coupled to the latch cavity and the hook cavity, respectively, when the detachable CAS is in a deployed position.

In various embodiments, forming the detachable CAS may comprise forming a first section, the first rod and the second rod situated within the first section, and the first post and second post extending from a rear surface of the first section. The method may further comprise pivotably coupling a second section to the first section via the second rod.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with aircraft CASs. However, various aspects of the disclosed embodiments may be adapted for performance in a variety of other systems. As such, numerous applications of the present disclosure may be realized.

A CAS as disclosed herein may utilize a simple mechanical mechanism to allow the CAS to transition from a stowed position to a deployed position, or vice versa. As such, the CAS as disclosed herein may be able to function without the use of heavy hinge and/or linear guide mechanisms often associated with conventional CASs. Accordingly, the detachable CAS disclosed herein may result in increased reliability, decreased manufacturing costs, as well as reduced weight of the associated aircraft.

Figure 1A:
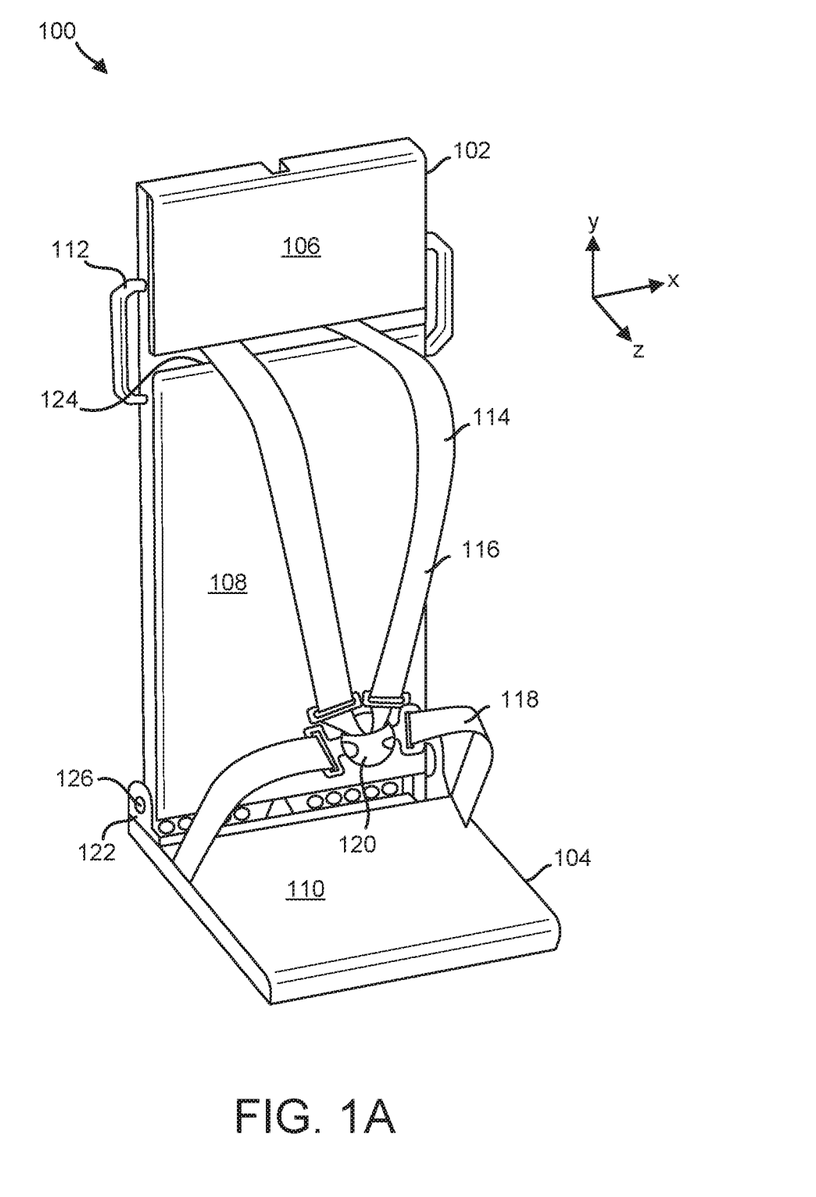
FIG. 1A illustrates a front perspective view of a detachable CAS, in accordance with various embodiments.

A perspective front view of detachable CAS 100 is illustrated in FIG. 1A, in accordance with various embodiments. Detachable CAS 100 may comprise a first section 102 and a second section 104. First section 102 and/or second section 104 may comprise substantially rectangular shaped components. Second section 104 may be pivotably coupled to first section 102 such that second section 104 may be rotated relative to first section 102. For example, second section 104 may be configured to rotate about the x-axis in a clockwise and counterclockwise direction in order to allow detachable CAS 100 to be positioned for use or stowage. First section 102 may comprise a head rest 106 and a back rest 108 adjacent to head rest 106. Head rest 106 may be displaced in the positive y-axis direction from back rest 108. Second section 104 may comprise a seat rest 110. Head rest 106, back rest 108, and seat rest 110 may be configured to provide comfort to a user. As such, head rest 106, back rest 108, and seat rest 110 may each comprise a padded material capable of deforming in response to applied forces by the user and may each comprise a leather or fabric material filled with a foam, for example.

Detachable CAS 100 may further comprise one or more handles 112. Handles 112 may be coupled to first section 102 and/or second section 104 in various embodiment and be configured to provide an ergonomic grip that may allow a user to maneuver detachable CAS 100. In various embodiment, handles 112 may comprise an aluminum or polymer material. Handles 112 may comprise one or more roughened surfaces to improve grip, in various embodiments. While illustrated in FIG. 1 as being coupled on a first end near head rest 106 and on a second end near back rest 108, handles 112 are not limited in this regard and may be coupled to any suitable portions of detachable CAS 100.

In various embodiments, detachable CAS 100 may further comprise a seat belt 114 coupled to one or more portions of detachable CAS 100. As appreciated to one of skill in the art, seat belt 114 may be configured to restrain a position of a user relative to detachable CAS 100. In various embodiments, seat belt 114 may comprise one or more shoulder straps 116 and one or more lap straps 118. Shoulder straps 116 may be coupled to a first rod 124 (with momentary reference to FIG. 1B) coupled to first section 102. Shoulder straps 116 may be configured to be placed around the upper body of a user, while lap straps 118 may be configured to be placed around a lower body of a user.

In various embodiments, seat belt 114 may comprise a buckle 120. Buckle 120 may be configured to detachably couple shoulder straps 116 and lap straps 118 to secure a user. For example, buckle 120 may comprise a latching mechanism wherein shoulder straps 116 and lap straps 118 may be inserted into and locked into buckle 120. The user may disengage the latching mechanism in buckle 120 to release shoulder straps 116 and lap straps 118 by pressing a button for example, thereby allowing a user to remove seat belt 114.

As previously stated, second section 104 may be pivotably coupled to first section 102, in accordance with various embodiments. For example, first section 102 may comprise one or more flanges 122 coupled to second section 104. Flanges 122 may be manufactured as an integral, monolithic portion of second section 104 or manufactured separately and later coupled to second section 104. Flanges 122 may comprise a steel or steel alloy in various embodiments. Flanges 122 may each comprise one or more apertures configured to receive a second rod 126 coupled to first section 102. In such a way, second rod 126 may be inserted through the apertures in flanges 122 and allow rotation of second section 104 relative to first section 102. As will be discussed below, such movement allows second section 104 to be folded adjacent to first section 102 such that detachable CAS 100 can be positioned in a compact manner for stowage.

Figure 1B:
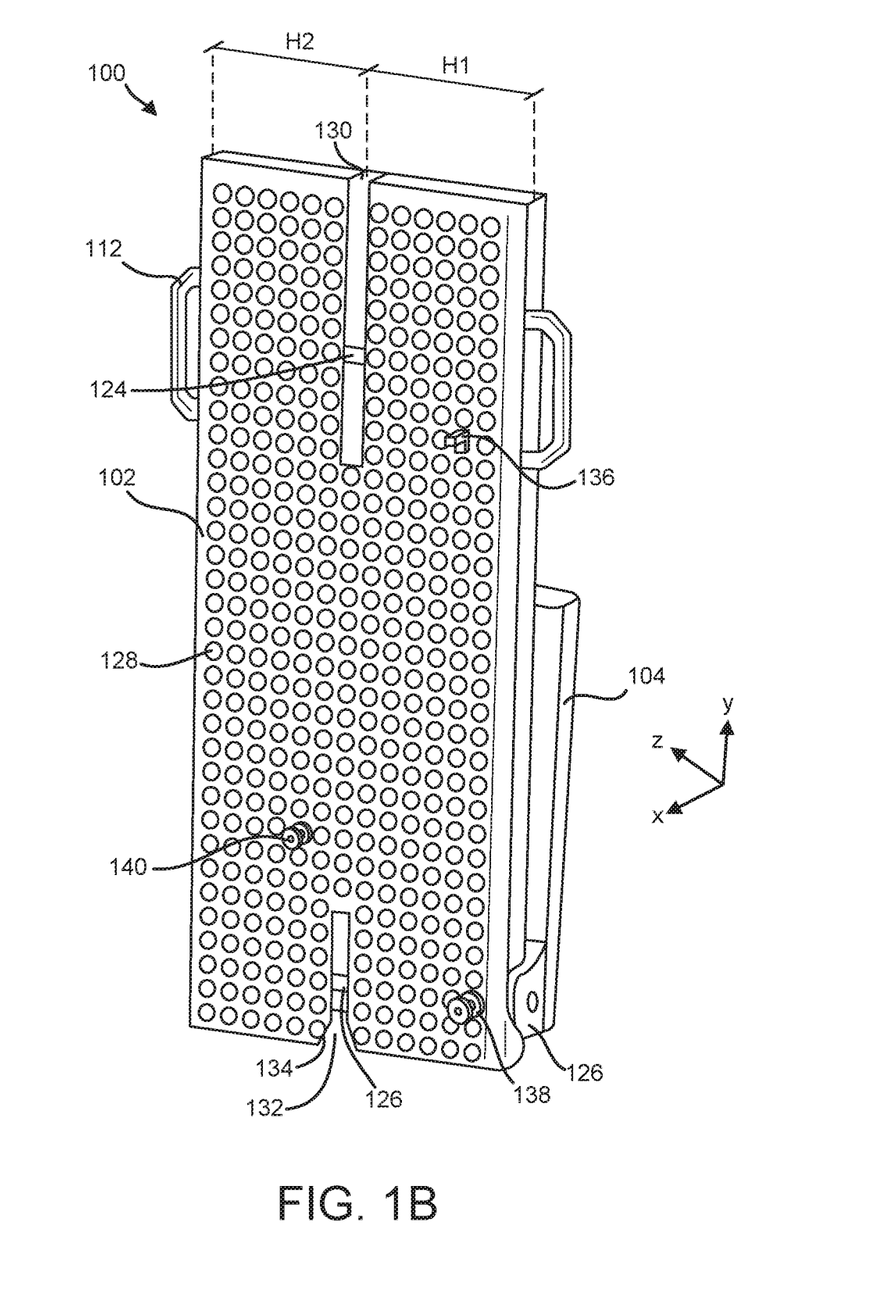
FIG. 1B illustrates a rear perspective view of a detachable CAS, in accordance with various embodiments.

Moving on and with reference to FIG. 1B, detachable CAS 100 is illustrated from a rear perspective view, in accordance with various embodiments. First section 102 and second section 104 of detachable CAS 100 may comprise any suitable, lightweight material, including an aluminum or aluminum alloy material. First section 102 and/or second section 104 may comprise one or more punchouts 128 extending through a surface of first section 102 and/or second section 104 to reduce a weight of detachable CAS 100. First section 102 may comprise a first rod 124 and a second rod 126 situated within first section 102. First rod 124 and/or second rod 126 may be machined into first section 102, in various embodiments.

In various embodiment, first section 102 may further comprise a first cutout 130 extending from a top of first section 102. As referred to herein, top, upper, above, superior, or other similar terms may denote a direction in the positive y-axis direction, while bottom, lower, below, inferior, or other similar terms may denote a direction in the negative y-axis direction. First cutout 130 may extend to a position below first rod 124, in various embodiments. First section 102 may also comprise a second cutout 132 extending from a bottom of first section 102. Second cutout 132 may extend to a position above second rod 126. First cutout 130 and second cutout 132 may comprise rectangular-shaped cutouts, in various embodiments. Second cutout 132 may comprise one or more beveled edges 134 near the bottom of first section 102 to assist in guiding various components toward second rod 126.

First section 102 may further comprise one or more posts, in various embodiments. For example, first section 102 may comprise a first post 136 configured to interface with a latch of a mount assembly while detachable CAS 100 is in a stowed position, in accordance with various embodiments. First post 136 may comprise a substantially rectangular component coupled to and extending from a rear surface of first section 102. First post 136 may be manufactured as a monolithic portion of first section 102 or manufactured separately from first section 102 and coupled to first section 102. For example, in various embodiments, first post 136 may be bolted, screwed, brazed, welded, fastened, or otherwise coupled to first section 102. In various embodiments, first post 136 may be located on a first half H1 of first section 102, proximate to a top portion of first section 102, however, is not limited in this regard and may be coupled to other portions of first section 102.

First section 102 may further comprise a second post 138 configured to interface with a hook of a mount assembly while detachable CAS 100 is in a stowed position, in accordance with various embodiments. Second post 138 may comprise a substantially cylindrical component coupled to and extending from the rear surface of first section 102. Second post 138 may be manufactured as an integral portion of first section 102 or manufactured separately from first section 102 and coupled to first section 102. For example, in various embodiments, second post 138 may be bolted, screwed, brazed, welded, fastened, or otherwise coupled to first section 102. In various embodiments, second post 138 may be located on first half H1 of first section 102, proximate to a bottom portion of first section 102, however, is not limited in this regard and may be coupled to other portions of first section 102.

First section 102 may further comprise a third post 140 configured to interface with a stabilization cavity of a mount assembly while detachable CAS 100 is in a stowed position, in accordance with various embodiments. Third post 140 may comprise a substantially cylindrical component coupled to and extending from a rear surface of first section 102. Third post 140 may be manufactured as an integral portion of first section 102 or manufactured separately from first section 102 and coupled to first section 102. For example, in various embodiments, third post 140 may be bolted, screwed, brazed, welded, fastened, or otherwise coupled to first section 102. Third post 140 may be positioned superior to second post 138 and on a second half H2 of first section 102.

Figures 2A, 2B:
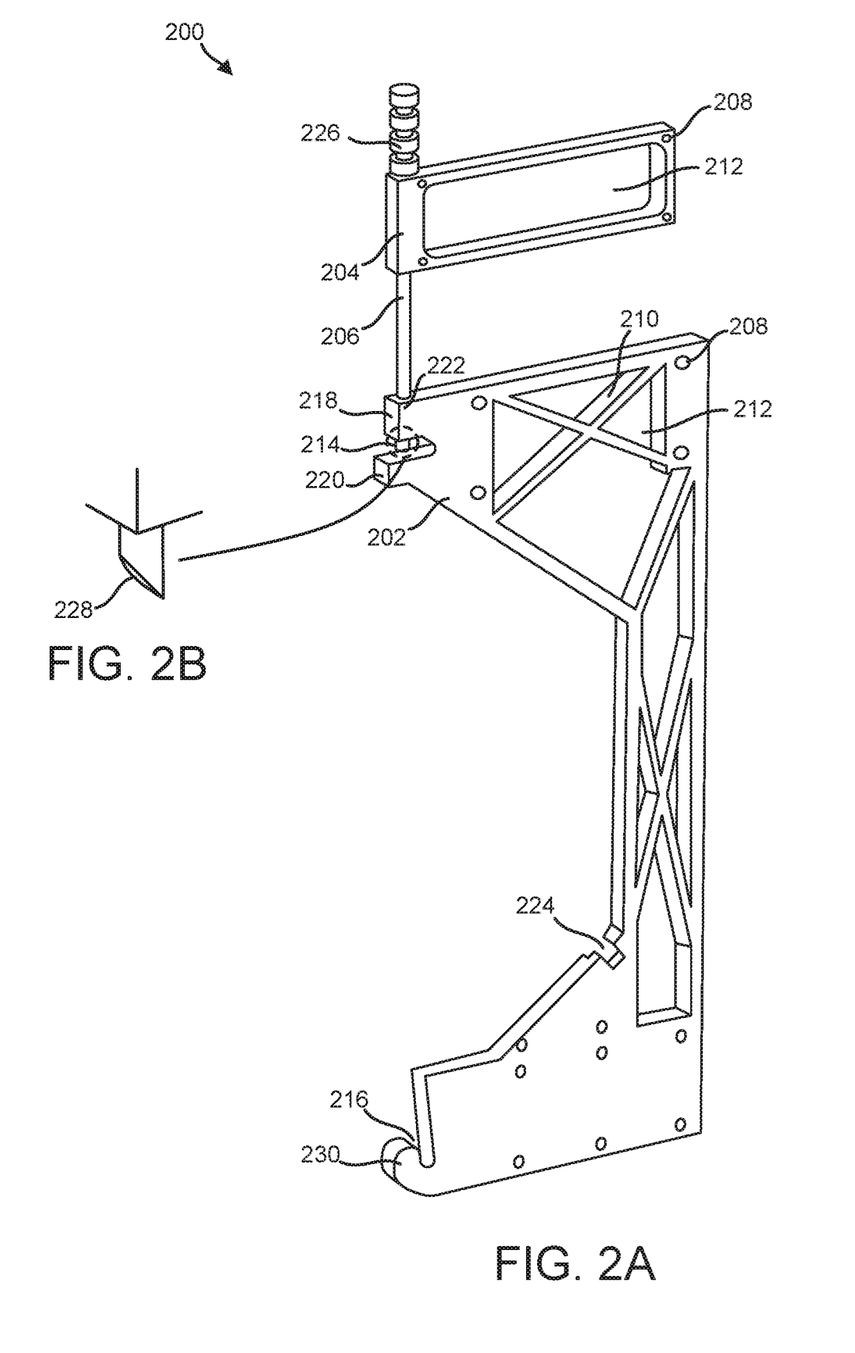
FIG. 2A illustrates a perspective view of a mount assembly for a detachable CAS, in accordance with various embodiments.
FIG. 2B illustrates a perspective view of a beveled surface of a locking pin of a mount assembly for a detachable CAS, in accordance with various embodiments.

With reference to FIGS. 2A-2B, a perspective view of a mount assembly 200 is illustrated in accordance with various embodiments. Mount assembly 200 may be configured to be coupled to a surface of an aircraft cabin such as a storage closet and/or cabin wall and provide support for detachable CAS 100 while detachable CAS 100 is in a stowed position and/or deployed position. Mount assembly 200 may comprise a main frame 202, a secondary frame 204, and a locking pin 206, in various embodiments.

Main frame 202 may comprise a metallic material such as aluminum, an aluminum alloy, steel, or steel alloy. Main frame 202 may comprise a rigid component comprising a geometry suited for coupling detachable CAS 100 to main frame 202, and thereby to an aircraft cabin surface. Main frame 202 may comprise one or more apertures 208 extending through main frame 202 and configured to receive an equal number of fasteners to couple main frame 202 to an aircraft cabin surface. In various embodiment, main frame 202 may comprise one or more struts 210 and one or more voids 212. One or more voids 212 may be configured to reduce a weight of main frame 202, while one or more struts 210 may be configured to provide structural support for main frame 202 in view of the one or more voids 212.

Main frame 202 may further comprise a latch cavity 214 and a hook cavity 216. In various embodiments, latch cavity 214 and hook cavity 216 may be formed on main frame 202 on the same side of main frame 202. As will be further discussed with respect to FIGS. 4A through 4D, latch cavity 214 may be configured to receive and couple to first post 136 of detachable CAS 100 in a stowed position and configured to receive and couple to first rod 124 of detachable CAS 100 in a deployed position. Latch cavity 214 may be formed by an upper protrusion 218 and a lower protrusion 220. Upper protrusion 218 may comprise a channel 222 extending through upper protrusion 218 and configured to receive locking pin 206. Hook cavity 216 may be configured to receive and couple to second post 138 of detachable CAS 100 in a stowed position and receive and couple to second rod 126 of detachable CAS 100 in a deployed position, in accordance with various embodiments. Main frame 202 may further comprise a stabilization cavity 224. Stabilization cavity 224 may be configured to receive and couple to third post 140 when detachable CAS 100 is in a stowed position, in accordance with various embodiments.

Mount assembly 200 may further comprise a secondary frame 204. Secondary frame 204 may comprise a substantially rectangular, rigid component configured to be coupled to an aircraft cabin surface above main frame 202. Secondary frame 204 may comprise a metallic material such as aluminum, an aluminum alloy, steel, or steel alloy. Similar to main frame 202, secondary frame 204 may comprise one or more apertures 208 configured to receive an equal number of fasteners to couple secondary frame 204 to the aircraft cabin surface. Further, secondary frame 204 may comprise at least one void 212 formed through secondary frame 204 such that a weight of secondary frame 204 is reduced.

In various embodiments, mount assembly 200 may further comprise a locking pin 206 configured to be inserted through upper protrusion 218 of secondary frame 204. Locking pin 206 may comprise a substantially cylindrical member comprising a stainless-steel material in various embodiments. Locking pin 206 may comprise a grip 226 located on a first end of locking pin 206 and a beveled surface 228 located on a second end of locking pin 206 (with momentary reference to FIG. 2B). Locking pin 206 may further comprise a spring configured to provide a bias force to locking pin 206 in the direction of main frame 202. Grip 226 may allow a user, such as a flight attendant, to apply a force in the opposite direction as the force applied by the spring (positive y-axis direction), thereby allowing various components of detachable CAS 100, such as first post 136 or first rod 124 to be removed from latch cavity 214. When the user releases grip 226, locking pin 206 may travel in the negative y-axis direction to automatically lock in place due to the biasing force applied by the spring. Beveled surface 228 of locking pin 206 may allow first post 136 and/or first rod 124 of detachable CAS 100 to urge locking pin 206 upward (in the positive y-axis direction) as first post 136 and/or first rod 124 contact locking pin 206 while being inserted into latch cavity 214.

Figure 3:
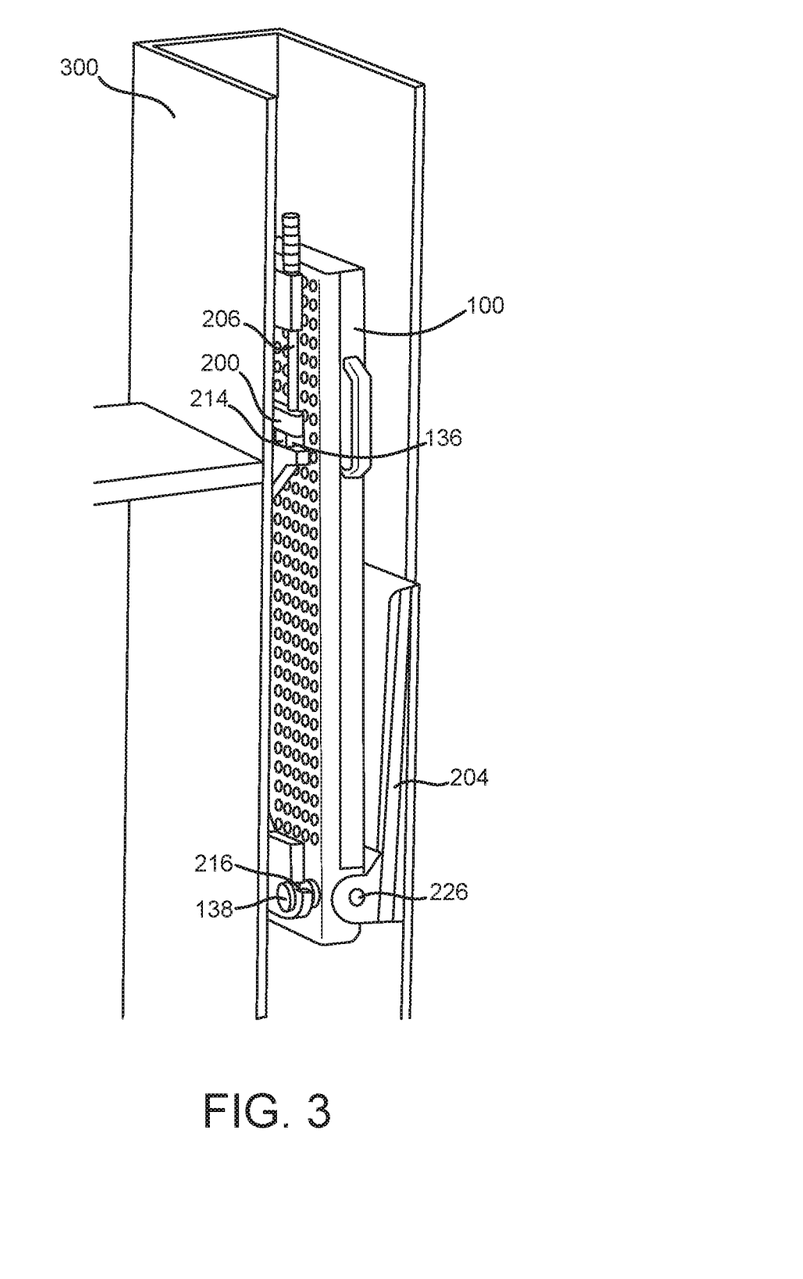
FIG. 3 illustrates a perspective view of a detachable CAS in a stowed position, in accordance with various embodiments.

Moving on and with reference to FIG. 3, detachable CAS 100 is illustrated in a stowed position, in accordance with various embodiments. Detachable CAS 100 may be stowed in a storage closet 300, for example. In the stowed position, first post 136 may be locked in place in latch cavity 214 via locking pin 206. Second post 138 may be positioned within hook cavity 216 and third post 140 may be positioned within stabilization cavity 224. Second section 104 may be rotated about second rod 126 such that detachable CAS 100 is maintained in a compact configuration.

Figure 4A:
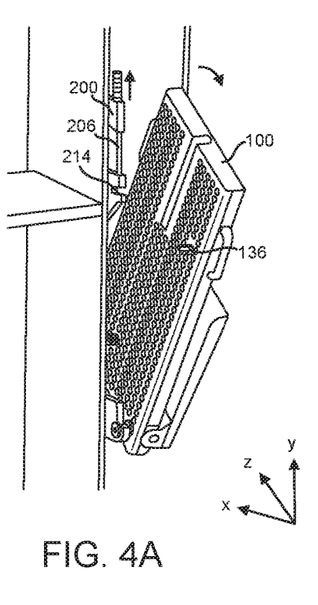
FIGS. 4A, 4B, and 4C illustrate a detachable CAS transitioning from a stowed position to a deployed position, in accordance with various embodiments.
Figure 4B:
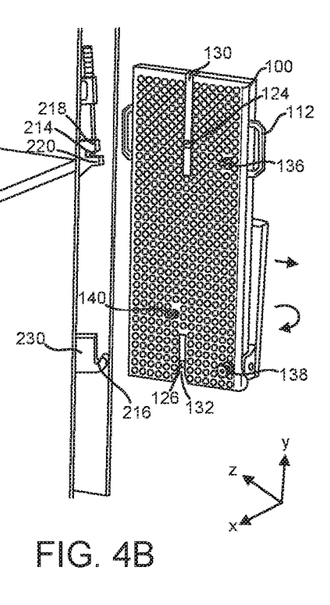
Figure 4C:
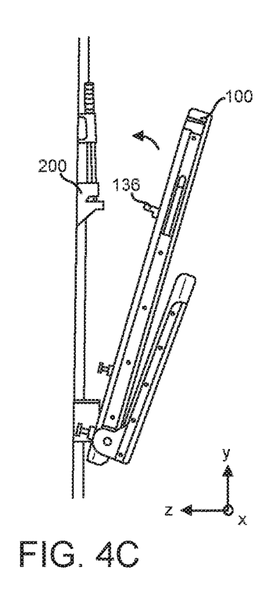

With reference to FIGS. 4A-4C, detachable CAS 100 is illustrated transitioning from a stowed position to a deployed position. First, a user may apply an upward force (positive y-axis direction) on locking pin 206 through grip 226 such that first post 136 may be removed from latch cavity 214 by rotating detachable CAS 100. Detachable CAS 100 may be configured to rotate about a pivot point caused by the cylindrical geometry associated with hook cavity 216 and second post 138. Upon rotation of detachable CAS 100, third post 140 may be removed from stabilization cavity 224, thereby allowing second post 138 to be lifted out of hook cavity 216 and completely detaching detachable CAS 100 from mount assembly 200. Handles 112 may provide a grip for a user to accomplish the aforementioned movements.

Figure 5:
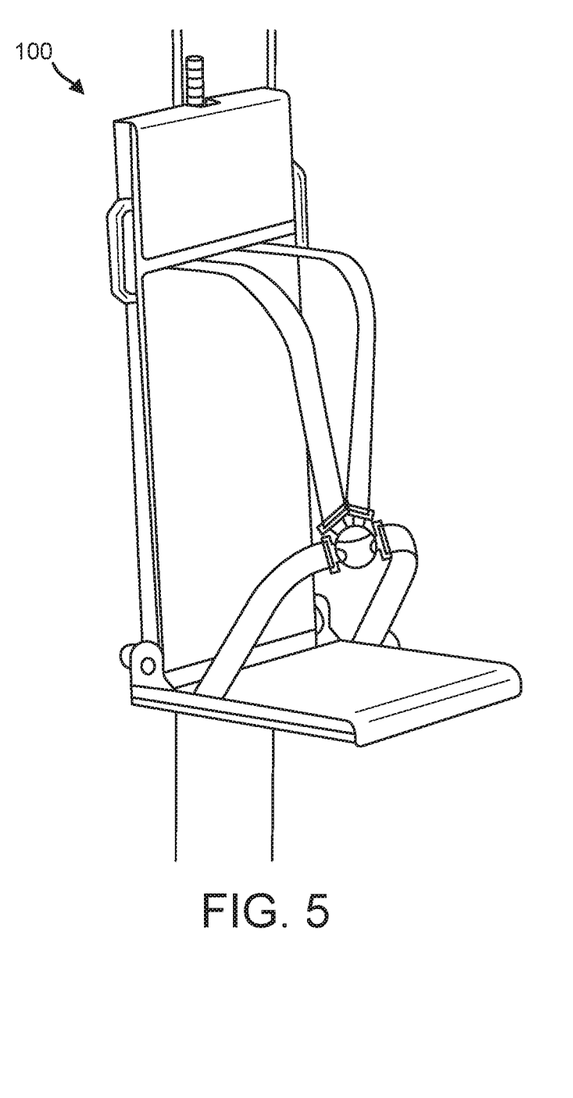
FIG. 5 illustrates a detachable CAS in a deployed position, in accordance with various embodiments.

Upon being detached from mount assembly 200, detachable CAS 100 may be rotated such that detachable CAS 100 may be aligned with mount assembly 200 to be recoupled with mount assembly 200. Hook 230 may be inserted through second cutout 132 and second rod 126 may be placed in hook cavity 216. Detachable CAS 100, now pivotably coupled to mount assembly 200, may be rotated such that upper protrusion 218 and lower protrusion 220 of main frame 202 are inserted through first cutout 130 and first rod 124 may be inserted into latch cavity 214. First rod 124 may contact beveled surface 228 of locking pin 206, thereby forcing locking pin 206 upward (in the positive y-axis direction). Once first rod 124 passes locking pin 206, locking pin 206 may moves downward (in the negative y-axis direction) via the biasing force applied by the spring, thereby locking first rod 124 within latch cavity 214. Second section 104 may then be rotated downward and detachable CAS 100 may arrive in the deployed position. FIG. 5 illustrates a perspective view of detachable CAS 100 in the deployed position. To transition back into the stowed position, locking pin 206 may be pulled upwards (in the positive y-axis direction) and the process may be reversed.

Figure 6:
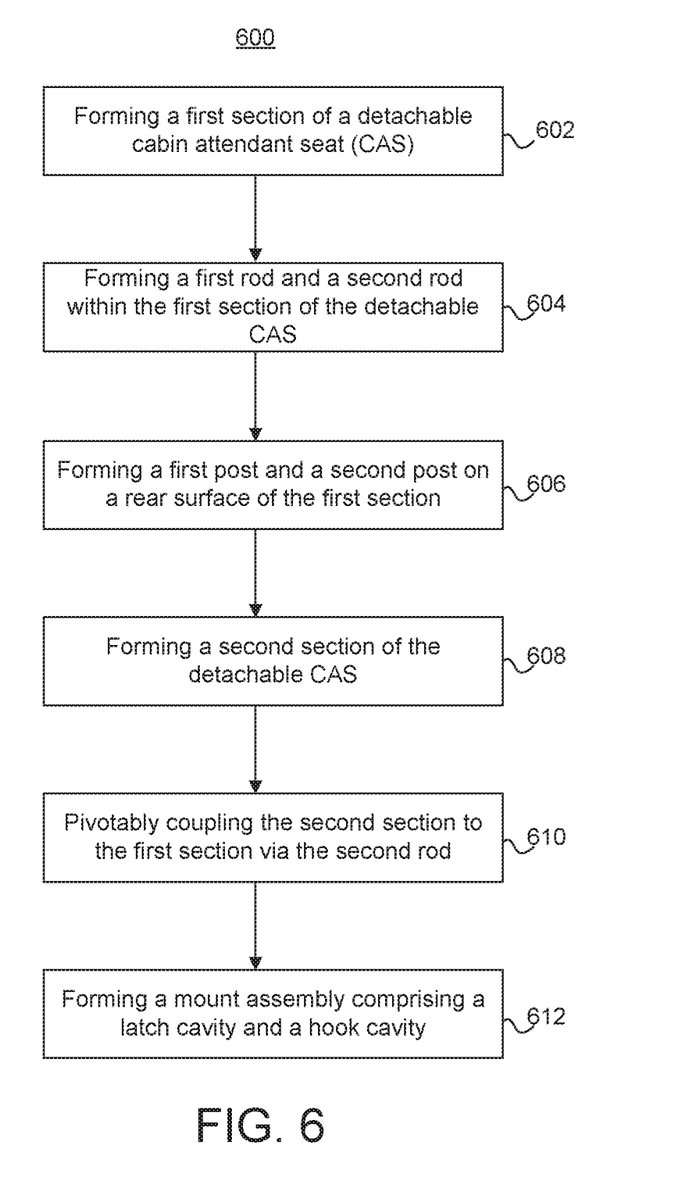
FIG. 6 illustrates a method of manufacturing a detachable CAS, in accordance with various embodiments.

A block diagram illustrating a method of manufacturing a detachable CAS mounting assembly is illustrated in FIG. 6, in accordance with various embodiments. The method may comprise forming a first section of a detachable cabin attendant seat (CAS) (step 602). The method may comprise forming a first rod and a second rod within the first section of the detachable CAS (step 604). The method may comprise forming a first post and a second post on a rear surface of the first section (step 606). The method may comprise forming a second section of the detachable CAS (step 608). The method may comprise pivotably coupling the second section to the first section via the second rod (step 610). The method may comprise forming a mount assembly comprising a latch cavity and a hook cavity (step 612).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and computer-readable media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A detachable cabin attendant seat, comprising:
    a first section, comprising:
        a first rod and a second rod; and
        a first post and a second post extending from the first section,
        wherein the first post and the second post are configured to be coupled to a mount assembly when the detachable cabin attendant seat is in a stowed position and the first rod and the second rod are configured to be coupled to the mount assembly when the detachable cabin attendant seat is in a deployed position, and wherein the first post urges a locking pin of the mount assembly upward while the first post is inserted into a latch cavity of the mount assembly.

2. The detachable cabin attendant seat of claim 1, further comprising a third post extending from the first section and configured to be coupled to the mount assembly when the detachable cabin attendant seat is in the stowed position.

3. The detachable cabin attendant seat of claim 1, further comprising a second section pivotably coupled to the first section.

4. The detachable cabin attendant seat of claim 3, wherein the second section is pivotably coupled to the first section via the second rod.

5. The detachable cabin attendant seat of claim 1, further comprising a first cutout proximate to a top portion of the first section and a second cutout proximate to a bottom portion of the first section.

6. The detachable cabin attendant seat of claim 1, wherein the first rod and the second rod are situated within the first section and wherein the first post and the second post extend from a rear surface of the first section.

7. The detachable cabin attendant seat of claim 1, further comprising one or more handles coupled to an edge of the first section.

8. A detachable cabin attendant seat assembly, comprising:
- a detachable cabin attendant seat; and
- a mount assembly, wherein the detachable cabin attendant seat is configured to be coupled to the mount assembly via a first post and a second post in a stowed position and coupled to the mount assembly via a first rod and a second rod in a deployed position, wherein:
  - the mount assembly comprises a main frame comprising a hook cavity and a latch cavity, and
  - the mount assembly further comprises a locking pin configured to lock the first post and the first rod in place upon entering the latch cavity.

9. The detachable cabin attendant seat assembly of claim 8, wherein the hook cavity is configured to receive the second post in the stowed position and receive the second rod when the detachable cabin attendant seat is in the deployed position.

10. The detachable cabin attendant seat assembly of claim 8, wherein the latch cavity is configured to receive the first post in the stowed position and receive the first rod when the detachable cabin attendant seat is in the deployed position.

11. The detachable cabin attendant seat assembly of claim 8, wherein the locking pin comprises a latch cavity beveled surface configured to urge the locking pin upwards in response to contact from the first post or the first rod.

12. The detachable cabin attendant seat assembly of claim 8, wherein the locking pin is situated within a channel formed through an upper protrusion of the main frame.

13. The detachable cabin attendant seat assembly of claim 8, wherein the detachable cabin attendant seat further comprises a third post and the main frame further comprises a stabilization cavity, wherein the stabilization cavity is configured to receive the third post when the detachable cabin attendant seat is in the stowed position.

14. The detachable cabin attendant seat assembly of claim 8, wherein the detachable cabin attendant seat is configured to be completely detached from the mount assembly to transition the detachable cabin attendant seat from the stowed position to the deployed position.

15. The detachable cabin attendant seat assembly of claim 8, wherein the mount assembly further comprises a secondary frame configured to receive the locking pin.

16. A method of manufacturing a detachable cabin attendant seat mounting assembly, comprising:
- forming a detachable cabin attendant seat comprising a first post, a second post, a first rod, and a second rod; and
- forming a mount assembly comprising a latch cavity and a hook cavity, wherein the first post and the second post are configured to be coupled to the latch cavity and the hook cavity, respectively, when the detachable cabin attendant seat is in a stowed position, wherein the first rod and the second rod are configured to be coupled to the latch cavity and the hook cavity, respectively, when the detachable cabin attendant seat is in a deployed position, and wherein the mount assembly further comprises a locking pin configured to lock the first post and the first rod in place upon entering the latch cavity.

17. The method of claim 16, wherein forming the detachable cabin attendant seat comprises forming a first section, the first rod and the second rod situated within the first section, and the first post and the second post extending from a rear surface of the first section.

18. The method of claim 17, further comprising pivotably coupling a second section to the first section via the second rod.

19. A detachable cabin attendant seat, comprising:
a first section, comprising:
- a first rod and a second rod;
- a first post and a second post extending from the first section; and
- a third post extending from the first section and configured to be coupled to a mount assembly when the detachable cabin attendant seat is in a stowed position,
wherein the first post and the second post are configured to be coupled to the mount assembly when the detachable cabin attendant seat is in the stowed position and the first rod and the second rod are configured to be coupled to the mount assembly when the detachable cabin attendant seat is in a deployed position.

20. A detachable cabin attendant seat, comprising:
a first section, comprising:
- a first rod and a second rod;
- a first post and a second post extending from the first section; and
- a first cutout proximate to a top portion of the first section and a second cutout proximate to a bottom portion of the first section,
wherein the first post and the second post are configured to be coupled to a mount assembly when the detachable cabin attendant seat is in a stowed position and the first rod and the second rod are configured to be coupled to the mount assembly when the detachable cabin attendant seat is in a deployed position.

21. A detachable cabin attendant seat, comprising:
a first section, comprising:
- a first rod and a second rod; and
- a first post and a second post extending from the first section, wherein:
  - the first post and the second post are configured to be coupled to a mount assembly when the detachable cabin attendant seat is in a stowed position,
  - the first rod and the second rod are configured to be coupled to the mount assembly when the detachable cabin attendant seat is in a deployed position,
  - the first rod and the second rod are situated within the first section, and
  - the first post and the second post extend from a rear surface of the first section.

* * * * *